United States Patent
Speldrich

(10) Patent No.: US 7,631,562 B1
(45) Date of Patent: Dec. 15, 2009

(54) MASS-FLOW SENSOR WITH A MOLDED FLOW RESTRICTOR

(75) Inventor: Jamie Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/193,976

(22) Filed: Aug. 19, 2008

(51) Int. Cl.
*G01F 1/37* (2006.01)

(52) U.S. Cl. .................................. 73/861.52

(58) Field of Classification Search .............. 73/204.26, 73/204.22, 202.5, 204.27; 137/493
See application file for complete search history.

(56) References Cited

U.S. PATENT DOCUMENTS

| | | | | |
|---|---|---|---|---|
| 4,519,246 | A * | 5/1985 | Hartemink | 73/202.5 |
| 4,648,270 | A * | 3/1987 | Johnson et al. | 73/202.5 |
| 5,072,752 | A * | 12/1991 | Kolchinsky | 137/493 |
| 6,234,016 | B1 * | 5/2001 | Bonne et al. | 73/204.26 |
| 6,655,207 | B1 | 12/2003 | Speldrich et al. | 73/202.5 |
| 7,255,001 | B1 | 8/2007 | Davis et al. | 73/204.26 |
| 7,258,003 | B2 | 8/2007 | Padmanabhan et al. | 73/204.26 |
| 7,275,415 | B2 | 10/2007 | Rhodes et al. | 73/28.01 |
| 7,278,309 | B2 | 10/2007 | Dmytriw et al. | 73/204.26 |
| 2005/0039809 | A1 | 2/2005 | Speldrich | 138/39 |
| 2006/0217900 | A1 | 9/2006 | Shajii et al. | 702/45 |
| 2007/0186643 | A1 | 8/2007 | Speldrich et al. | 73/204.26 |
| 2007/0193368 | A1 | 8/2007 | Speldrich | 73/861.52 |
| 2007/0204688 | A1 | 9/2007 | Dmytriw et al. | 73/204.26 |
| 2007/0271903 | A1 | 11/2007 | Rhodes et al. | 60/278 |
| 2008/0010821 | A1 | 1/2008 | Padmanabhan et al. | 29/842 |

FOREIGN PATENT DOCUMENTS

| | | |
|---|---|---|
| WO | WO 2005/022091 A1 | 3/2005 |
| WO | WO 2007/095460 A1 | 8/2007 |
| WO | WO 2007/095528 A1 | 8/2007 |
| WO | WO 2007/101185 A1 | 9/2007 |

* cited by examiner

*Primary Examiner*—Jewel Thompson
(74) *Attorney, Agent, or Firm*—Tuesday A. Kaasch; Kermit D. Lopez; Luis M. Ortiz

(57) ABSTRACT

A high mass-flow sensing apparatus and method of forming the same, comprising a flow tube bypassed in a flow path defined by a flow channel, through which a fluid flows. A flow sensor can be disposed in the flow tube for measuring a flow rate of the fluid in the flow channel. A set of narrow rectangular flow restrictors can be molded into the flow tube and adjacent to the flow sensor. Each flow restrictor can include several rectangular cutouts that are molded into upstream and/or downstream portions of the flow tube in order to limit the flow rate of the fluid across the flow sensor. The flow restrictors can laminarize the flow rate of the fluid in the flow tube and thereby reduce flow turbulence and lead to optimal sensing performance of the flow sensor.

10 Claims, 2 Drawing Sheets

MASS-FLOW SENSOR WITH A MOLDED FLOW RESTRICTOR

TECHNICAL FIELD

Embodiments are generally related to mass-flow sensing devices and methods. Embodiments are also related to airflow sensors that incorporate the use of a molded flow restrictor. Embodiments are additionally related to an improved method for providing flow restriction utilizing a flow restrictor.

BACKGROUND OF THE INVENTION

Fluid flow rate control mechanisms are utilized in a variety of flow systems in order to control the amount of fluid such as, for example, gas or liquid, passing through a flow system. Flow control mechanisms can be utilized to regulate flow rates in systems such as ventilators and respirators for maintaining a sufficient flow of breathable air or providing sufficient anesthetizing gas to a patient in preparation for surgery. Typically, flow rate control occurs through the utilization of control circuitry responsive to measurements obtained from fluid flow sensors. Such a fluid flow sensor may be configured to measure properties of a fluid in contact with the sensor and to provide output signals in response to the fluid flow rates in a flow channel.

Additionally, these flow sensors may measure a flow rate by sampling a fluid by means of a bypass flow channel in parallel with a flow restrictor placed in the main flow channel. Fluid flow sensors can be utilized in a variety of fluid-sensing applications for detecting the movement of fluids. Such fluid-sensing applications may include, but are not limited to, industrial, commercial, medical and automotive industries. For example, an airflow sensor is often employed in the medical industry to monitor and/or control a patient's breathing. Similarly, an airflow sensor might also be employed in a valve to control ratio of gas mixing prior to combustion. Such flow sensors are susceptible to mis-measurement due to turbulent flow effects (e.g., non-uniformity in flow velocity and pressure), and thus the accuracy of such sensors may be adversely affected by such factors.

The majority of prior art mass-flow sensors require additional pressure restriction in the flow path, especially in a bypass, in order to limit the amount of fluid flow through the sensor and avoid output saturation. These types of flow restrictors may include the use of one or more sintered metal restrictors or orifices, such as, for example, machined sapphire orifices, which are typically installed into a flow path of a flow channel. Such sintered restrictors and orifices are costly to manufacture. Orifices produce a flow jet, which can lead to an increase in flow turbulence. Therefore, it is desirable to provide an airflow sensor that incorporates the use of one or more improved flow restrictors and which is capable of accurately and reliably measuring fluid flow in a stable and turbulence-free manner.

In an effort to address the foregoing difficulties, it is believed that a need exists for an improved and inexpensive flow restrictor that laminarizes flow and reduces flow turbulence. It is believed that the improved flow restrictor disclosed herein can address these and other continuing needs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved mass-flow sensing device and method of using and producing the same.

It is another aspect of the present invention to provide for an airflow sensor, which incorporates the use of an improved flow restrictor.

The aforementioned aspects and other objectives and advantages can now be achieved as described herein. A mass-flow sensing device and a method of forming the same are disclosed. The mass-flow sensing device/apparatus generally includes a flow tube bypassed in a flow path defined by a flow channel, through which a fluid flows. The flow tube is preferably formed from a plastic material, but may be formed from another material. A flow sensor (e.g., an airflow sensor) can be disposed in the plastic flow tube for measuring a flow rate of the fluid in the flow channel. A set of narrow rectangular flow restrictors can be molded into the plastic flow tube and positioned adjacent to the airflow sensor. The rectangular flow restrictors have a laminarizing effect on the flow of the fluid in the flow tube, thereby reducing flow turbulence, which can lead to an optimal sensing performance of the airflow sensor.

Furthermore, the rectangular cutouts of the flow restrictors can form a number of orifices adapted to the flow tube for producing a uniform flow of fluid across the flow tube. The flow restrictors can promote a bi-directional flow of the fluid through the flow tube. Such flow restrictors can provide enhanced laminarization of the fluid flow as well as an improved calibration between the airflow sensor and the flow restrictor, thereby producing more accurate flow measurements. The high-mass-flow sensing device disclosed herein can therefore avoid flow turbulence and output saturation at a low cost without the need for additional pressure restriction in the flow path of the bypass flow channel.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
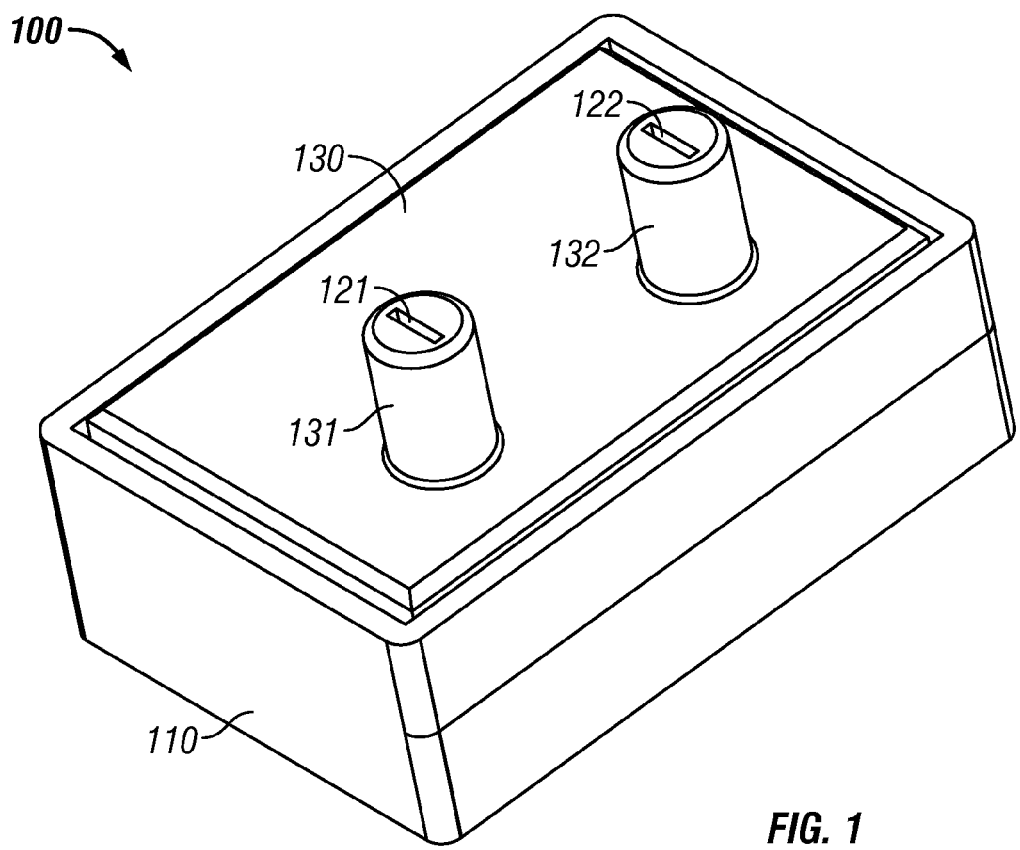
FIG. 1 illustrates a general perspective view of a mass-flow sensing device, which can be adapted for use in implementing a preferred embodiment.
Figure 2:
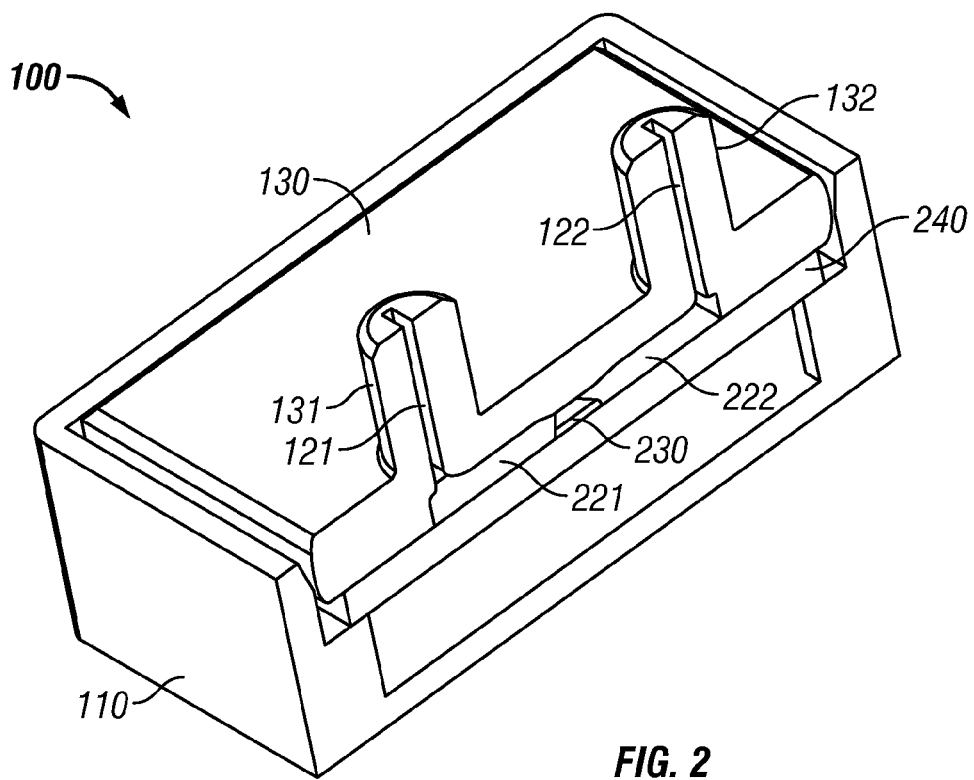
FIG. 2 illustrates a schematic diagram of a module including an electronic display meter and the high mass-flow sensing device, in accordance with an alternative embodiment.

FIG. 1 illustrates a general perspective view of a mass-flow sensing apparatus 100, which can be adapted for use in implementing a preferred embodiment. The mass-flow sensing apparatus 100 can include a body 110 and flow tube 130 which can be fitted with ports 131 and 132 having restrictors 121 and 122, so that a fluid enters restrictor 121, flows through flow channel 221 and 222 as depicted in FIG. 2 and exits the restrictor 122. Note that as utilized herein the term "fluid" can refer to a gas and/or a liquid. Thus, the high mass-flow sensing apparatus 100 can be utilized in a flow system (not shown) for measuring a flow rate of the fluid. Note that the embodiments discussed herein generally relate to an airflow sensing system. It can be appreciated, however, that such embodiments can be implemented in the context of other sensing systems and designs and are not limited to the airflow sensing technique. The discussion of airflow sensing systems, as utilized herein, is presented for general illustrative purposes only.

FIG. 2 further illustrates the fluid mass flow sensing apparatus 100. The upstream restrictor 121 and the downstream restrictor 122 can be formed in plastic flow tube 130. The body 110 of the sensing apparatus 100 further includes a circuit board 240 and airflow sensor 230 assembled therein. The flow restrictors 121 and 122 and channels 221 and 222 can be provided to handle the fluid flow as it passes through the flow tube 130 such that the fluid can be directed to the airflow sensor 230 via the upstream and downstream portions 221 and 222.

In addition, the flow tube 130 and body 110 can be formed utilizing an injection molding process. The airflow sensor 230 of the sensing apparatus 100 can be implemented by means of semiconductor and integrated circuit fabrication techniques. The flow restrictor 121 and 122 can preferably exhibit a rectangular cross-sectional shape and size compatible with the flow system. Such sensing apparatus 100 can quantify mass-flow rates of the fluid 310 with a greater signal-to-noise ratio in order to achieve an improvement in accuracy and resolution in fluid flow rate measurements due to the laminarizing effect of the rectangular restrictor.

Figure 3:
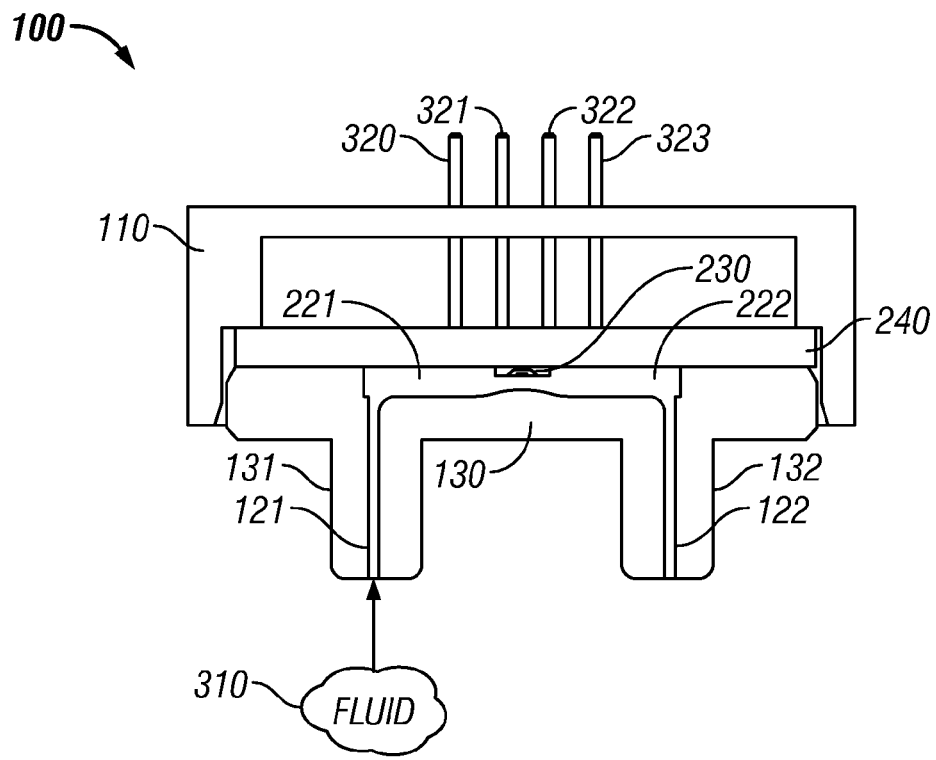
FIG. 3 illustrates a schematic cross-sectional view of the high mass-flow sensing device, which indicates the direction of a fluid flow, in accordance with a preferred embodiment.

FIG. 3 illustrates a side view of a module 100 including electrical connector pins 320, 321, 322, and 323. The fluid 310 in the flow system can be passed through the flow restrictor 121, flow channels 221 and 222 and flow restrictor 122 which can be molded into the plastic flow tube 130. The flow restrictors 121 and 122 can be utilized to control the flow of fluid 310 across the airflow sensor 230. Note that in FIGS. 1-4 identical parts or elements are generally indicated by identical reference numerals.

The airflow sensor 230 can be arranged in a uni-directional or bi-directional fluid flow configuration in order to produce a proportional electrical signal in accordance with the sensed property or concentration of the fluid 310. The flow sensing apparatus 100 can be utilized in numerous flow systems, such as reactors, ventilators and respirators, for accurately measuring the flow rate of the fluid 310 across airflow sensor 230. The direction of the fluid 310 through plastic flow tube 130 can be clearly illustrated in FIG. 3. Again, as a reminder, in FIGS. 1-4 identical parts or elements are generally indicated by identical reference numerals.

The flow restrictors 121 and 122 can be associated with the plastic flow tube 130, wherein the flow restrictors 121 and 122 promote a bi-directional flow of the fluid 310 through the plastic flow tube 130. The flow restrictors 121 and 122 can be provided in the shape of a narrow, elongated channel in order to laminarize flow and prevent flow eddies, which create flow instability and output noise. The flow restrictors 121 and 122 can be disposed in the upstream and/or downstream portions 131 and 132 of the flow tube 130, respectively. The flow restrictors 121 and 122 have a rectangular cross section which produce a substantially uniform, laminar flow across the flow sensor 230 and thereby reducing flow turbulence, which leads to sensing performance improvement.

Figure 4:
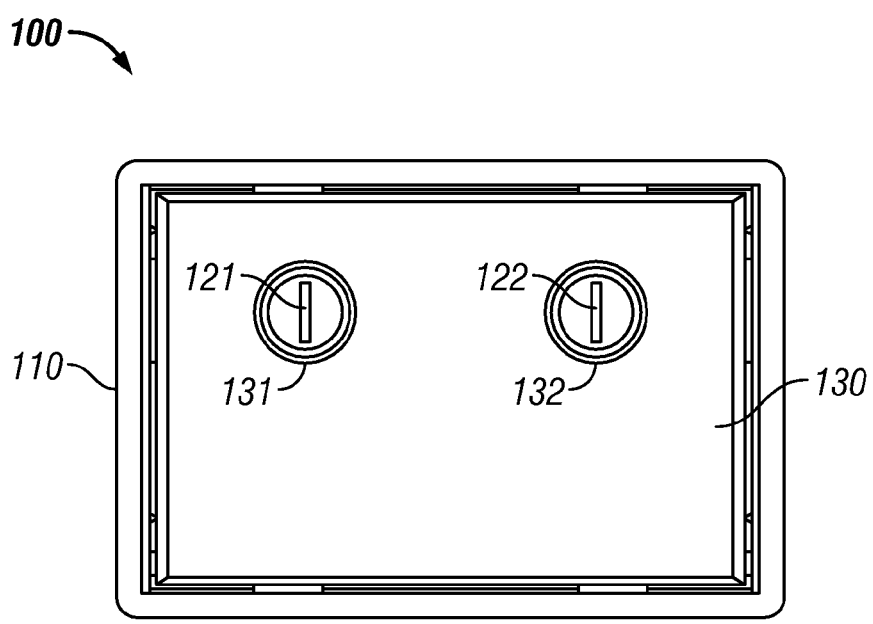
FIG. 4 illustrates a cross-sectional view of the high mass-flow sensing device as shown in FIG. 3 along line A-A, in accordance with a preferred embodiment.

FIG. 4 illustrates a top view of the mass-flow sensing apparatus 100, in accordance with a preferred embodiment. The flow restrictors 121 and 122 of the flow sensing apparatus 100 can be molded in a narrow rectangular shape in order to restrict the flow of the fluid 310 across the airflow sensor 230. The restriction of the flow rate of the fluid 310 can be dependent on geometry of the flow restrictors 121 and 122. The airflow sensor 230 can measure the property of the fluid 310 within the flow channel 221 and 222. The airflow sensor 230 can be placed on a substrate 240, which is covered by flow tube 130.

The flow restrictors 121 and 122 can reduce flow turbulence by reducing Reynolds Number which is a dimensionless. The orifices 221 of the flow restrictor 121 and 122 can be rectangular in shape, which results in more uniform reduction of flow turbulence across the entire flow channel 221 and 222. The reduction in the flow rate of the fluid 310 across the flow restrictors 230 is also dependent on size and uniformity of these orifices 221. The flow restrictors 121 and 122 can include, but are not limited to, an orifice, a capillary tube, a porous plug, a nozzle, and an adjustable valve.

Additionally, the flow restrictors 121 and 122 can be an adjustable flow restrictor. Therefore, the restriction of the flow of the fluid 310 can be adjusted based on one or more factors. These factors may include, but are not limited to, the flow rate of the fluid 310, the molecular weight of the fluid 310, and the ratio of specific heats of the fluid 310. The flow restrictors 121 and 122 and the airflow sensor 230 can be integrated and molded within the plastic flow tube 130. The orifices 221 of the flow restrictors 121 and 122 can include rectangular cutout formed therein. Such flow restrictors 121 and 122 can be inexpensive to manufacture and implement, since they are capable of being molded into the flow tube 130, instead of the flow channel 221 and 222.

It will be appreciated that variations of the above-disclosed and other features and functions, or alternatives thereof may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A high mass-flow sensing apparatus, comprising:
   a flow tube bypassed in a flow path defined by a flow channel, through which a fluid flows, wherein said flow tube includes at least one upstream portion and at least one downstream portion;
   a flow sensor disposed between said at least one upstream portion and said at least one downstream portion of said flow tube in order to measure a flow rate of said fluid in said flow channel, wherein said flow sensor is associated with said flow path of said flow channel; and
   at least one flow restrictor molded in a narrow rectangular shape into said flow tube and located adjacent to said flow sensor, wherein said at least one flow restrictor laminarizes said flow rate of said fluid in said flow tube, thereby reducing flow turbulence, and promotes a bidirectional flow of said fluid through said flow tube which contributes to an optimal sensing performance of said flow sensor.

2. The apparatus of claim 1 wherein said at least one flow restrictor is located only in said at least one upstream portion of said flow tube.

3. The apparatus of claim 1 wherein said at least one flow restrictor is located only in said at least one downstream portion of said flow tube.

4. The apparatus of claim 1 wherein said fluid comprises a gas or a liquid.

5. A high mass-flow sensing apparatus, comprising:
- a flow tube bypassed in a flow path defined by a flow channel, through which a fluid flows, wherein said flow tube includes at least one upstream portion and at least one downstream portion;
- a flow sensor disposed between said at least one upstream portion and said at least one downstream portion of said flow tube in order to measure a flow rate of said fluid in said flow channel, wherein said flow sensor is associated with said flow path of said flow channel, wherein said flow sensor comprises an airflow sensor; and
- at least one flow restrictor molded in a narrow rectangular shape into said flow tube and located adjacent to said flow sensor, wherein said at least one flow restrictor laminarizes said flow rate of said fluid in said flow tube, thereby reducing flow turbulence, which contributes to an optimal sensing performance of said flow sensor.

6. The apparatus of claim 5 wherein said flow tube comprises a plastic material.

7. The apparatus of claim 5 wherein said at least one flow restrictor promotes a bi-directional flow of said fluid through said flow tube.

8. A high mass-flow sensing method, comprising:
- bypassing a flow tube in a flow path defined by a flow channel, through which a fluid flows, wherein said flow tube includes at least one upstream portion and at least one downstream portion;
- disposing a flow sensor between said at least one upstream portion and said at least one downstream portion of said flow tube in order to measure a flow rate of said fluid in said flow channel, wherein said flow sensor is associated with said flow path of said flow channel; and
- molding at least one flow restrictor in a narrow rectangular shape into said flow tube and located adjacent to said flow sensor, wherein said at least one flow restrictor laminarizes said flow rate of said fluid in said flow tube, thereby reducing flow turbulence, which contributes to an optimal sensing performance of said flow sensor.

9. The method of claim 8 further comprising configuring said flow tube from a plastic material.

10. The method of claim 8 further comprising configuring said at least one flow restrictor to promote a bi-directional flow of said fluid through said flow tube.

* * * * *